W. J. PAUL.
SAFETY GUARD.
APPLICATION FILED MAY 8, 1913.

1,230,921.

Patented June 26, 1917.

Witness
L. R. Fiedler

Inventor
William J. Paul
By A. P. Greely
Attorney

UNITED STATES PATENT OFFICE.

WILLIAM J. PAUL, OF PITTSBURGH, PENNSYLVANIA.

SAFETY-GUARD.

1,230,921. Specification of Letters Patent. Patented June 26, 1917.

Application filed May 8, 1913. Serial No. 766,457.

*To all whom it may concern:*

Be it known that I, WILLIAM J. PAUL, a citizen of the United States, residing at Pittsburgh, in the county of Allegheny and State of Penn., have invented certain new and useful Improvements in Safety-Guards, of which the following is a specification.

My invention relates to a substitute for cotter pins adapted to prevent axial movement of a shaft in a bearing or a wheel or pulley carried by the shaft and my invention has for its object to provide a device which will be effective for the purposes for which a cotter pin is ordinarily used and will at the same time be so constructed as not to present any projecting point to cause accidents by catching the clothing of persons passing near the shaft. The invention has for a further object to provide a device of this character which will cover and protect the end of a shaft.

With these and other objects hereinafter described in view, my invention consists in the construction and combination of elements hereinafter described and claimed.

Referring to the drawings.

Figure 1:
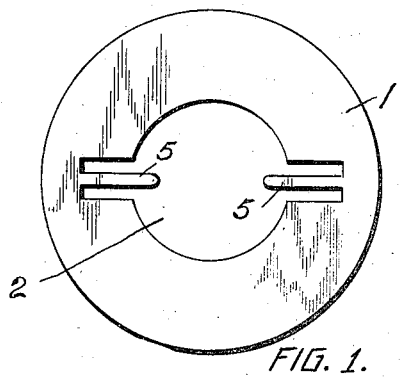
Figure 1 is a face view of a device embodying my invention.

In the drawings, 1 indicates a solid flat disk of sheet metal having a centrally located opening 2 of sufficient diameter to fit snugly over the shaft 3. In the form shown in Figs. 1, 4 and 5, the opening 2 is formed by cutting out the center, and in the form shown in Figs. 2, 3 and 6, a dome or cap 4 is formed by upsetting the central portion of the disk. In both forms the device is provided at diametrically opposite points with radially and inwardly extending tongues 5 adapted to be seated in the opposite ends of a transverse bore 6 in the shaft 3, the outer end or point of connection of the tongues with the disk being located outside the periphery of the opening.

In use the tongues 5 are first bent to bring their inner ends outside the periphery of the opening 2 and the device is slipped with tongues 5 advancing onto the shaft until the inner ends of the tongues 5 rest over the outer ends of the transverse bore 6; the inner ends of the tongues are then straightened so as to enter the ends of the bore 6 and the device then pushed farther onto the shaft thereby straightening the tongues until they are again in the plane of the disk, and extending into bore 6, with the inner face of the disk resting against the hub of a wheel 7, or other element which is to be held against movement longitudinally of the shaft or in contact with an element to prevent relative longitudinal movement of the shaft. When the device is thus in position, displacement of the device is prevented owing to the fact that any pressure, as seen in Fig. 5, will be applied to the tongues, said tongues being supported approximately opposite the pressure which will be seen is applied at the surface of shaft 3; in this way while the tongue is of relatively light construction and is easily bent for entrance into bore 6, said tongues will resist a considerable amount of longitudinal thrust of the parts.

Figure 2:
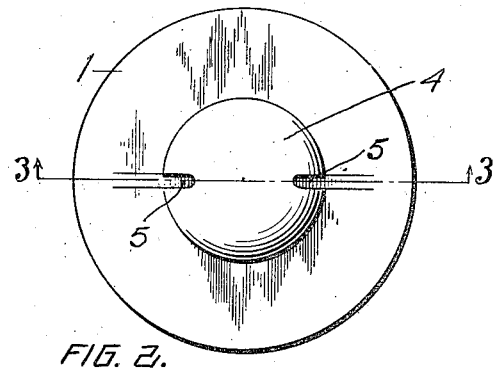
Fig. 2 is a similar view of a modified form of my device.
Figures 3, 4, 5:
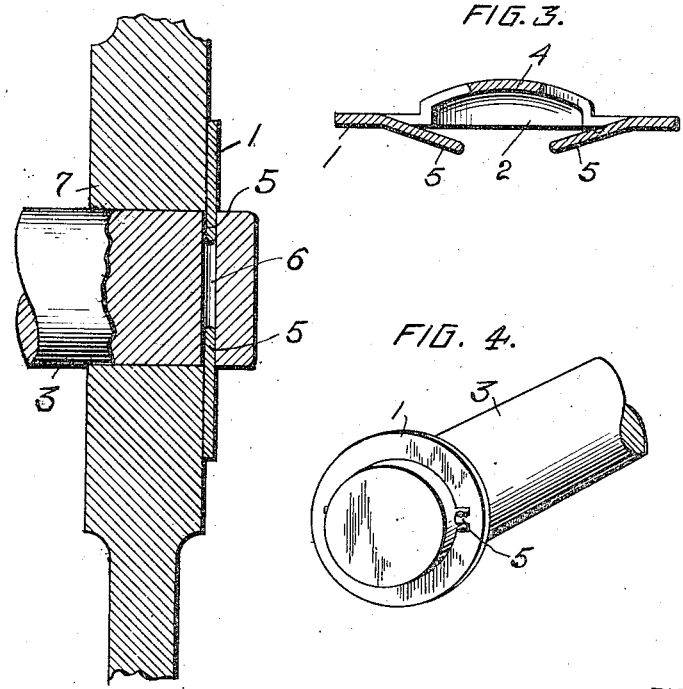
Fig. 3 is a cross sectional view on line 3—3 of Fig. 2.
Fig. 4 is a perspective view of the device as shown in Fig. 1 applied to a shaft.
Fig. 5 is a longitudinal sectional view of a portion of a shaft having the device as shown in Fig. 1 applied thereto.
Figure 6:
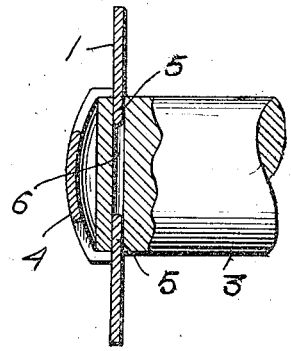
Fig. 6 is a similar view showing the device of Fig. 2 applied to a shaft.

The form of the device shown in Figs. 2, 3 and 6 provides for covering the end of the shaft by the dome 4 thus giving a smooth curved surface which will not catch clothing or anything else which may come in contact with it. In the form of the device shown in Figs. 1, 4 and 5, the disk presents a smooth outer surface free from points or other projections such as would be liable to catch clothing.

The device may be made of sheet metal or other suitable material sufficiently flexible to permit the tongues to be bent, and yet stiff enough to retain their shape after being straightened, as above described.

It will, of course, be understood that the size and shape of the central opening may be varied and the tongues made any length desired.

Having thus described my invention, what I claim is:

1. A locking device for the purpose described, comprising a plate having an opening and a plurality of flexible tongues extending into said opening from points outside of the periphery of the opening.

2. A locking device for the purpose described, comprising a ring carrying pliable tongues springing from points between the opening and the periphery of the ring and adapted to extend terminally within the opening.

3. A locking device for the purpose described, comprising a one piece ring carrying integral pliable tongues springing from points between the opening and the periphery of the ring and normally extending terminally within the opening.

4. A device for use on a shaft consisting of a disk having its central portion cupped so as to form an opening within the cup adapted to fit over the end of the shaft and having oppositely arranged tongues at the base of the cup adapted to extend into openings in the shaft.

5. A device of the class described, consisting of a disk having a cupped portion adapted to cover the end of the shaft, and inwardly extending flexible tongues adapted to enter cavities in the shaft.

6. A device of the class described, consisting of a disk having a central portion upstruck to form a cavity adapted to receive the end of the shaft and having tongues extending into the space within the cavity.

In testimony whereof I have affixed my signature in presence of two witnesses.

WILLIAM J. PAUL.

Witnesses:
EDWARD A. YOCHUM,
J. L. TREFALLER, Jr.